United States Patent
Chauvin et al.

(10) Patent No.: US 11,262,893 B1
(45) Date of Patent: Mar. 1, 2022

(54) APPARATUS, SYSTEM AND METHOD FOR GENERATING CUSTOM WORKSPACES IN A MEDICAL COMPUTER SYSTEM ENVIRONMENT

(71) Applicant: ALLSCRIPTS SOFTWARE, LLC, Chicago, IL (US)

(72) Inventors: George A. Chauvin, Ferrisburgh, VT (US); Jefferson Wilson, Williston, VT (US); Thomas A. Hartman, Lake Wylie, SC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 0 days.

(21) Appl. No.: 16/183,676

(22) Filed: Nov. 7, 2018

(51) Int. Cl.
*G06F 17/00* (2019.01)
*G06F 3/0484* (2022.01)
*G06F 9/54* (2006.01)
*G06F 16/955* (2019.01)
*G06F 40/30* (2020.01)
*G06F 40/279* (2020.01)

(52) U.S. Cl.
CPC ............ *G06F 3/0484* (2013.01); *G06F 9/543* (2013.01); *G06F 16/9558* (2019.01); *G06F 40/279* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 2004/0153435 A1* | 8/2004 | Gudbjartsson | G06F 16/284 |
| 2013/0086495 A1* | 4/2013 | Guzansky | G06Q 20/00 |
| | | | 715/762 |
| 2013/0139081 A1* | 5/2013 | Alon | G06Q 10/10 |
| | | | 715/765 |
| 2013/0159926 A1* | 6/2013 | Vainer | G06F 16/24575 |
| | | | 715/804 |
| 2014/0023341 A1* | 1/2014 | Wang | G11B 27/105 |
| | | | 386/240 |
| 2014/0089775 A1* | 3/2014 | Worsley | G06F 16/27 |
| | | | 715/230 |
| 2014/0222853 A1* | 8/2014 | Massand | G06F 16/951 |
| | | | 707/758 |
| 2014/0325552 A1* | 10/2014 | Evans | H04N 21/2668 |
| | | | 725/28 |
| 2015/0339034 A1* | 11/2015 | Garcia | G06F 3/04817 |
| | | | 715/738 |

(Continued)

*Primary Examiner* — Mustafa A Amin
(74) *Attorney, Agent, or Firm* — Loza & Loza, LLP; Peter Zura (57) ABSTRACT

Technologies and techniques modifying a workspace on a processing device. A processor operating environment includes a workspace manager module, configured to generate a workspace for a processing device. Communications circuitry is configured to receive user annotation data and associated metadata relating to the workspace. An annotation data manager module is configured to process the received user annotation data and associated metadata to determine if at least one of the user annotation data and/or metadata matches pre-stored annotation data and/or metadata, wherein the workspace manager module is configured to generate a modified workspace for the processing device based on matching annotation data and/or metadata.

20 Claims, 9 Drawing Sheets

(56) References Cited

U.S. PATENT DOCUMENTS

| | | | |
|---|---|---|---|
| 2016/0034439 A1* | 2/2016 | Scheers | G06F 40/109 |
| | | | 715/232 |
| 2016/0147399 A1* | 5/2016 | Berajawala | H04L 67/10 |
| | | | 715/753 |
| 2016/0295086 A1* | 10/2016 | Bhat | G16H 80/00 |
| 2017/0161246 A1* | 6/2017 | Klima | G06F 40/263 |

* cited by examiner

APPARATUS, SYSTEM AND METHOD FOR GENERATING CUSTOM WORKSPACES IN A MEDICAL COMPUTER SYSTEM ENVIRONMENT

FIELD OF TECHNOLOGY

The present disclosure is directed to technologies and techniques for processing generating custom workspaces in a medical computer system environment. More specifically, the present disclosure is directed to utilizing web annotation to automatically customize workspaces and associated toolbars for medical computer systems.

BACKGROUND

Medical computer systems have become critical aspects of modern-day health care, and include systems such as hospital information systems (HISs), health information management (HIM) systems, electronic health record (EHR) systems and associated health information technology (HIT) that may incorporate aspects of medical record systems, medical imaging, personal health records and patient tracking systems. These system architectures have been configured using a single level platform and/or a plurality of levels (e.g., government level, territory level, and patient carrying level) and are generally supported in client-server architectures for networking and processing.

For many of such systems, applications associated with each system often utilize static application page definitions, headers and toolbars, define elements "inline" and are often incapable of, or poor at handling, integration into to 3rd party application. Additionally, medical computer systems and/or platforms are often not equipped to allow users to add, modify or remove information from a web resource without modifying the resource itself. Furthermore, there are no technologies currently available that allow computer systems to customize workspaces based on information provided in a web resource to suit a particular user or groups of users.

SUMMARY

Various apparatus, systems and methods are disclosed herein relating to modifying workspaces and toolbars on a processing device operating environment, based on annotations and associated metadata provided by users of the processing device.

In some illustrative embodiments, a system and apparatus is disclosed for modifying a workspace on a processing device, comprising a processor; a workspace manager module, configured to generate a workspace for a processing device a memory, operatively coupled to the processor; communications circuitry, operatively coupled to the processor, wherein the communications circuitry is configured to receive user annotation data and associated metadata relating to the workspace; and an annotation data manager module, configured to process the received user annotation data and associated metadata to determine if at least one of the user annotation data and/or metadata matches pre-stored annotation data and/or metadata, wherein the workspace manager module is configured to generate a modified workspace for the processing device based on matching annotation data and/or metadata.

In some illustrative embodiments, the user annotation data comprises data describing a characteristic of the workspace and the metadata comprises at least one of data identifying a medical position of the user, a medical process being used or reviewed, location of the user, and a user team group.

In some illustrative embodiments, the annotation data manager module comprises a core layer, an extension layer, and a storage layer, operatively coupled to an application programming interface (API) for receiving the user annotation data and associated metadata. The annotation data manager module may further be configured to process the received user annotation data and associated metadata to determine if at least one of the user annotation data and/or metadata has similarity exceeding a predetermined threshold to pre-stored annotation data and/or metadata. The workspace manager module may be configured to generate a modified workspace for the processing device based on the annotation data and/or metadata having similarity exceeding the predetermined threshold. The annotation data manager module is further configured to determine if at least one of the user annotation data and/or metadata matches pre-stored annotation data and/or metadata utilizing one of a word-matching or vocabulary/semantics algorithm.

In some illustrative embodiments, methods are disclosed for modifying a workspace on a processing device, comprising generating a workspace for a processing device via a workspace manager module; receiving, via communications circuitry, user annotation data and associated metadata relating to the generated workspace; processing, via an annotation data manager, the received user annotation data and associated metadata to determine if at least one of the user annotation data and/or metadata matches pre-stored annotation data and/or metadata; and generating, via a workspace manager, a modified workspace for the processing device based on matching annotation data and/or metadata.

In some illustrative embodiments, the user annotation data comprises data describing a characteristic of the workspace and the metadata comprises at least one of data identifying a medical position of the user, a medical process being used or reviewed, location of the user, and a user team group.

In some illustrative embodiments, processing the received user annotation data and associated metadata the annotation data manager module comprises processing via a core layer, an extension layer, and a storage layer, operatively coupled to an application programming interface (API). In some illustrative embodiments, the methods further comprise processing, via the annotation data manager module, the received user annotation data and associated metadata to determine if at least one of the user annotation data and/or metadata has similarity exceeding a predetermined threshold to pre-stored annotation data and/or metadata. The methods may further comprise generating a modified workspace for the processing device, via the workspace manager, based on the annotation data and/or metadata having similarity exceeding the predetermined threshold. The methods may further comprise determining, via the annotation data manager module, if at least one of the user annotation data and/or metadata matches pre-stored annotation data and/or metadata utilizing one of a word-matching or vocabulary/semantics algorithm.

BRIEF DESCRIPTION OF THE FIGURES

The present invention is illustrated by way of example and not limitation in the figures of the accompanying drawings, in which like references indicate similar elements and in which.

DETAILED DESCRIPTION

Various embodiments will be described herein below with reference to the accompanying drawings. In the following description, well-known functions or constructions are not described in detail since they may obscure the invention in unnecessary detail.

It will be understood that the structural and algorithmic embodiments as used herein does not limit the functionality to particular structures or algorithms, but may include any number of software and/or hardware components. In general, a computer program product in accordance with one embodiment comprises a tangible computer usable medium (e.g., hard drive, standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Swift, Objective-C, Javascript, CSS, XML, etc.). Furthermore, the term "information" as used herein is to be understood as meaning digital information and/or digital data, and that the term "information" and "data" are to be interpreted as synonymous.

In addition, while conventional hardware components may be utilized as a baseline for the apparatuses and systems disclosed herein, those skilled in the art will recognize that he programming techniques and hardware arrangements disclosed herein, embodied on tangible mediums, are configured to transform the conventional hardware components into new machines that operate more efficiently (e.g., providing greater and/or more robust data, while using less processing overhead and/or power consumption) and/or provide improved user workspaces and/or toolbars for human-machine interaction.

Figure 1:
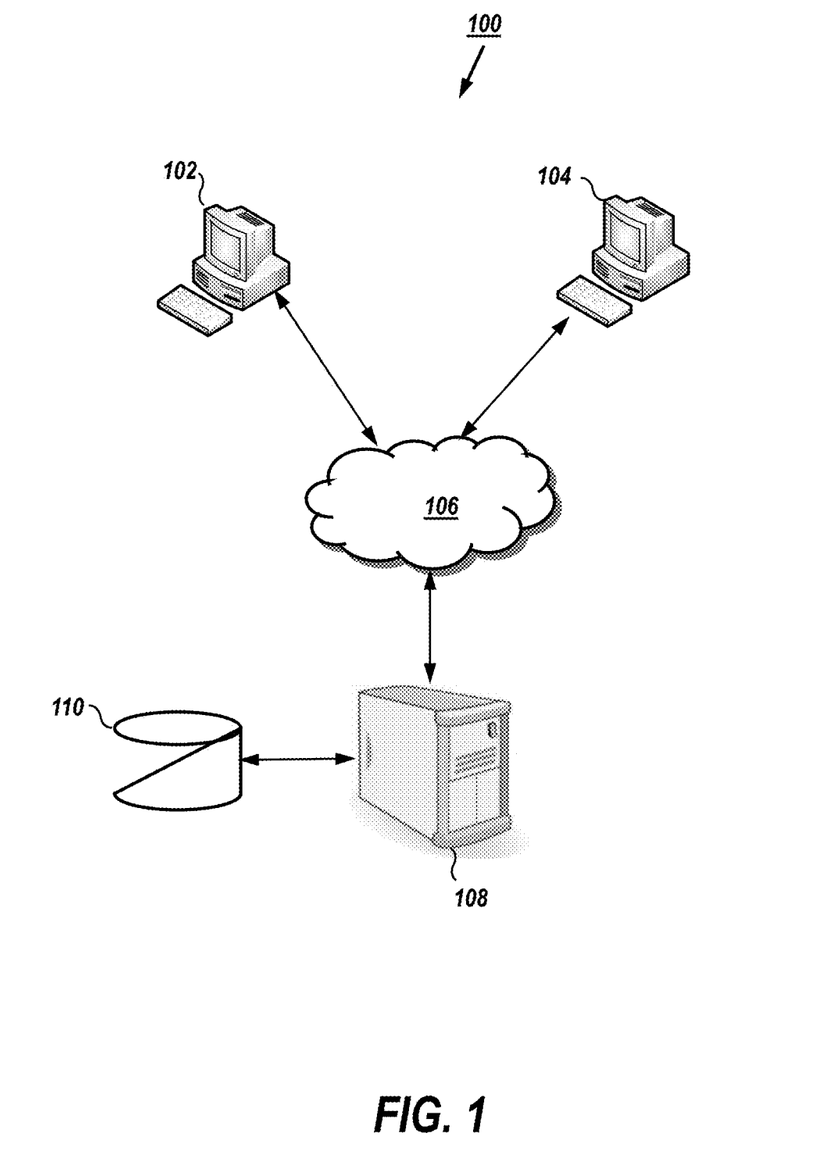
FIG. 1 illustrates a simplified overview of a processor-based computer system configured to modify workspaces under an illustrative embodiment.

Turning to FIG. 1, a system 100 is shown for generating and automatically customizing workspaces for a computing environment in a medical computer system. The system 100 may comprise one or more computing devices (102, 104), which may be workstations, personal computers (PCs), laptops, tablets, etc., that are coupled to a computer network 106. Server 108 may also be coupled to the network 106 and communicate with any of computing devices 102, 104. While only two computing devices are shown in the figure, those skilled in the art will recognize that any number of suitable computing devices may be coupled to network 106. Similarly, server 108 may be configured as a stand-alone server, or may be part of a server network that includes a plurality of server, or a cloud server network. Server 108 may be coupled to a central storage database 110, that stores data associated with web annotations, workspaces and toolbars. As will be explained in further detail below, the data from database 110, as well as data from computing devices 102, 104 may be processed by server 108 to provide customized computer workspaces and toolbars.

Figure 2:
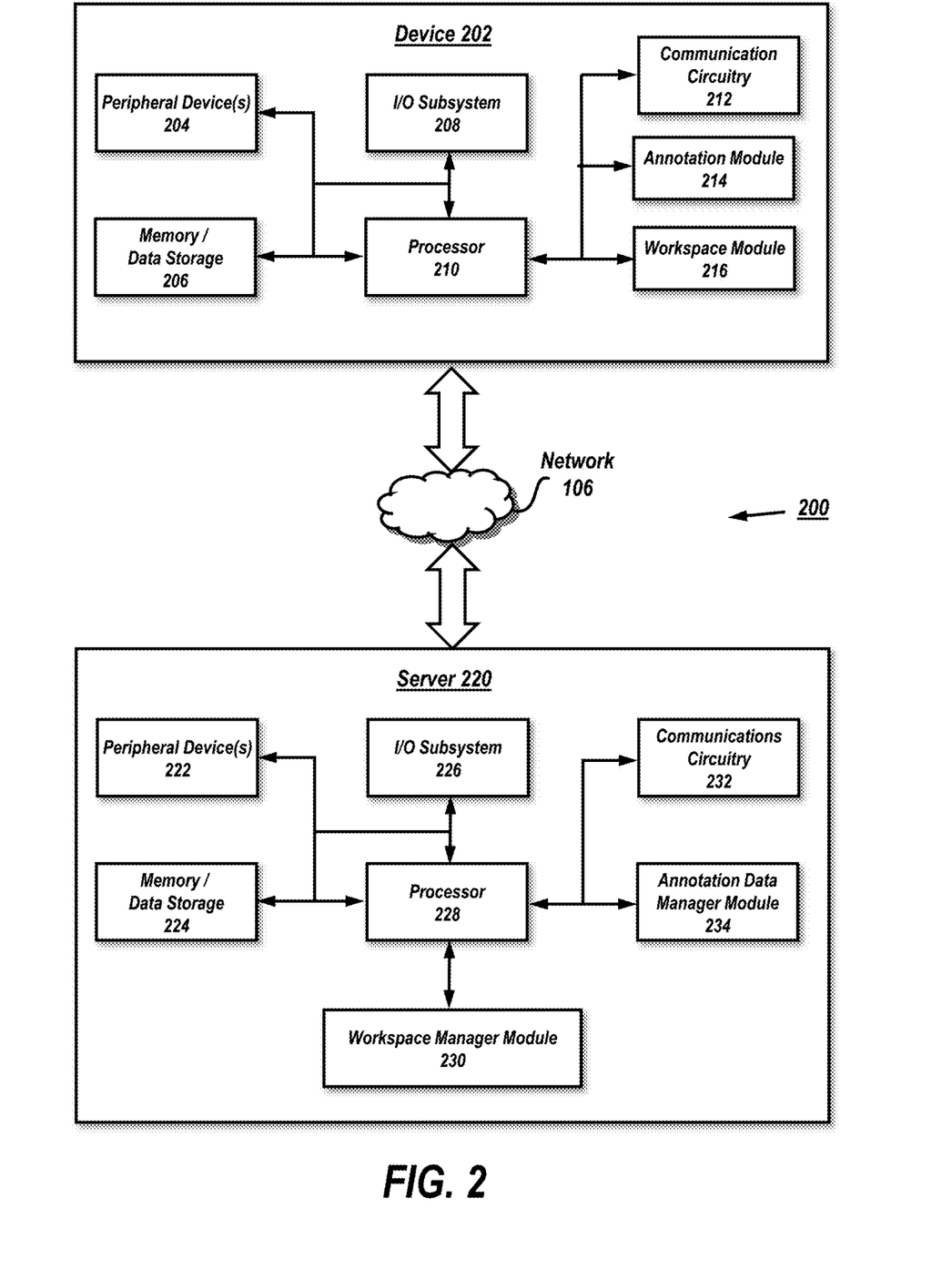
FIG. 2 schematically illustrates an operating environment for processing devices and a server communicatively coupled to a network for processing annotation and workspace data under an illustrative embodiment.

FIG. 2 shows an operating environment for system 200 that includes a processing device 202, which may be configured as any of computer devices 102, 104, and a server 220, which may be configured as server 108, communicating via the network 106, wherein the system is configured to provide customized computer workspaces and toolbars under an illustrative embodiment. In the illustrative embodiment, the processing device 202 includes a processor 210 or processor circuit, one or more peripheral devices 204, memory/data storage 206, communication circuitry 212, an annotation module 214, and workspace module 216. Annotation module 214 may be configured to operate according to the W3C Web Annotation Working Group data model and protocol specification, and create associations between distinct pieces of information received in device 202. In one example, a Web Annotation Data Model (WADM) may be utilized in the system 200 to provide an interoperable framework for expressing annotations such that they can be shared between platforms, with various data expressions to satisfy complex requirements while remaining simple enough to also allow for the most common use cases. An annotation may be Web Resource, configured as a set of connected resources, typically including a body and target, and conveys through the data that the body is related to the target. The exact nature of this relationship may change according to the intention of the annotation, but the body should be associated with the target in most cases. Additional functionality may be supported, enabling content to be embedded within the annotation, selecting arbitrary segments of resources, choosing the appropriate representation of a resource and providing styling hints to help users render the annotation appropriately. Annotations created by or intended for machines are also possible, ensuring that the Data Web is not ignored in favor of only considering the human-oriented Document Web.

In some illustrative embodiments, Web Resources for system 200 may be identified with an Internationalized Resource Identifier (IRI) and have various properties, often including a format or language for the resource's content. This information may be recorded as part of the Annotation, even if the representation of the resource must be retrieved from the Web. The IRI may be configured as an extension to the Uniform Resource Identifier (URI) specification to allow characters from Unicode, whereas URIs must be made up of a subset of ASCII characters. A mapping algorithm may be utilized for translating between IRIs and the equivalent encoded URI form. Annotations may involve part of an External Web Resource, rather than its entirety. In such cases, segments of resources may be identified using IRIs with a fragment component that, at the same time, both describes how to extract the segment of interest from the resource, and identifies the extracted content. For simple Annotations, it may be advantageous to be able to use these IRIs with a fragment component as the identifier for either Body or Target of medical data. In some illustrative embodiments, fragments may be defined with respect to individual media types.

In some illustrative embodiments, the WADM may be defined as a rooted, direct graph that represents a relationship between resources (e.g., bodies, targets), where the content of the body resource if related to the content of the target resource. Annotations, bodies and targets may have their own properties and relationships, typically including creation and descriptive information. The target of body resource may be more specific than the entity identified by the recourse. The target or body may be a specific segment of the resource, styled in a specific way, a specific state of the resource, may be included in the annotation to play a specific role, and/or any combination of the foregoing. A resource with these constraints is a separate resource from the annotation, body or target and is referred to as a SpecificResource. The SpecificResource refers to the source resource and the constraints that make it more specific. The identity of the SpecificResource should be separate from the descriptions of the constraints.

Workspace module 216 is configured to generate workspaces for device 202 that may include, but is not limited to, toolbars, interfaces, dialog boxes, and formatting related to a medical application being executed on device 202. The workspace module 216 may be configured to receive manual input and also receive automatically generated workspace data based on data received from annotation module 214. In some illustrative embodiments, annotation module 214 and workspace module 216 may be incorporated into memory/data storage 206 with or without a secure memory area, or may be a dedicated component, or incorporated into the processor 210. Of course, processing device 202 may include other or additional components, such as those commonly found in a digital apparatus and/or computer (e.g., sensors, various input/output devices), in other embodiments. Additionally, in some embodiments, one or more of the illustrative components may be incorporated in, or otherwise form a portion of, another component. For example, the memory/data storage 206, or portions thereof, may be incorporated in the processor 210 in some embodiments.

The processor 210 may be embodied as any type of processor currently known or developed in the future and capable of performing the functions described herein. For example, the processor 210 may be embodied as a single or multi-core processor(s), digital signal processor, microcontroller, or other processor or processing/controlling circuit. Similarly, memory/data storage 206 may be embodied as any type of volatile or non-volatile memory or data storage currently known or developed in the future and capable of performing the functions described herein. In operation, memory/data storage 206 may store various data and software used during operation of the processing device 210 such as access permissions, access parameter data, operating systems, applications, programs, libraries, and drivers.

Memory/data storage 206 may be communicatively coupled to the processor 210 via an I/O subsystem 208, which may be embodied as circuitry and/or components to facilitate input/output operations with the processor 210, memory/data storage 206, and other components of the processing device 202. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may form a portion of a system-on-a-chip (SoC) and be incorporated, along with the processor 210, memory/data storage 206, and other components of the processing device 202, on a single integrated circuit chip.

The processing device 202 includes communication circuitry 212 (communication interface) that may include any number of devices and circuitry for enabling communications between processing device 202 and one or more other external electronic devices and/or systems. Similarly, peripheral devices 204 may include any number of additional input/output devices, interface devices, and/or other peripheral devices. The peripheral devices 204 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

The server 220 may be embodied as any type of server (e.g., a web server, etc.) or similar computing device capable of performing the functions described herein. In the illustrative embodiment of FIG. 2 the server 220 includes a processor 228, an I/O subsystem 226, a memory/data storage 224, communication circuitry 232, and one or more peripheral devices 222. Components of the server 220 may be similar to the corresponding components of the processing device 202, the description of which is applicable to the corresponding components of server 220 and is not repeated herein for the purposes of brevity.

The communication circuitry 232 of the server 220 may include any number of devices and circuitry for enabling communications between the server 220 and the processing device 202. In some embodiments, the server 220 may also include one or more peripheral devices 222. Such peripheral devices 222 may include any number of additional input/output devices, interface devices, and/or other peripheral devices commonly associated with a server or computing device. The server 220 also includes an annotation data manager module 234 that is responsible for processing annotation data from annotation module 214 from device 202. The annotation data may be received from annotation module 214 in real-time as it is entered on device 202, or may be batch processed and/or pushed or otherwise transmitted at predetermined intervals.

Annotation data manager module 234 also communicates with workspace manager module 230. In one illustrative embodiment, annotation data manager module 234 processes the annotation data to identify if the annotation data contains predetermined annotation data. Additionally, annotation data manager module 234 may process the annotation data to identify similarities between the annotation data and one or more predetermined annotation data. For example, the annotation data may be in the form of a JSON-LD data stream that may be additionally converted to an XML representation of the JASON-LD data for indexing purposes, and to retrieve and display annotations for either a specific object or repository-wide.

Under an illustrative embodiment, when users interact with software being executed on device 202, they may add annotations to objects or other data related to a workspace, toolbar, and/or the software data itself. The annotations may also be provided for an object caption related to the medical software, or object type. As the annotations are provided, the annotation module 214 may forward the annotation data to annotation data manager module 234 of server 220. The annotation data manager module 234 may then proves the annotations to determine if specific annotation entries are present. This determination may be made by annotation data manager module 234 by matching annotations, and/or using a word-matching or vocabulary/semantics algorithm (e.g., Wordnet, BabelNet) to determine associated annotations having a similarity value that meets or exceeds a predetermined similarity threshold. Once specific and/or similar annotations are determined, the annotation data manager module 234 transmits the determined annotations to workspace manager module 230, which may be configured to modify an existing workspace and/or toolbars based on the annotation data and transmit the modified workspace to workspace module 215, which loads the modified workspace into device 202 during operation.

The disclosure configuration is particularly advantageous for customizing workspaces in a medical software environment, by allowing the system (e.g., 200) to customize workspaces for users. The customization may be based on any number of factors including, but not limited to, the medical position of the user (e.g., IT staff, nurse, doctor, technician, etc.), the medical process being used or reviewed during software execution (e.g., medical imaging, pharmaceutical, accounting), location of user, user team group, and so forth. As users from an organization enter annotations during software use, the system (e.g., 200) may customize the workspaces to provide optimal display, positioning and functionality of the workspace to each group according to their needs and/or preferences.

In the illustrated embodiment, communication between the server 220 and the processing device 202 takes place via the network 106 that may be operatively coupled to one or more network switches (not shown). In one embodiment, the network 106 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry of processing device 202 and the communication circuitry 232 of the server 220 may be configured to use any one or more, or combination, of communication protocols to communicate with each other such as, for example, a wired network communication protocol (e.g., TCP/IP), a wireless network communication protocol (e.g., Wi-Fi, WiMAX), a cellular communication protocol (e.g., Wideband Code Division Multiple Access (W-CDMA)), and/or other communication protocols. As such, the network 106 may include any number of additional devices, such as additional computers, routers, and switches, to facilitate communications between the processing device 202 and the server 220.

Figure 3:
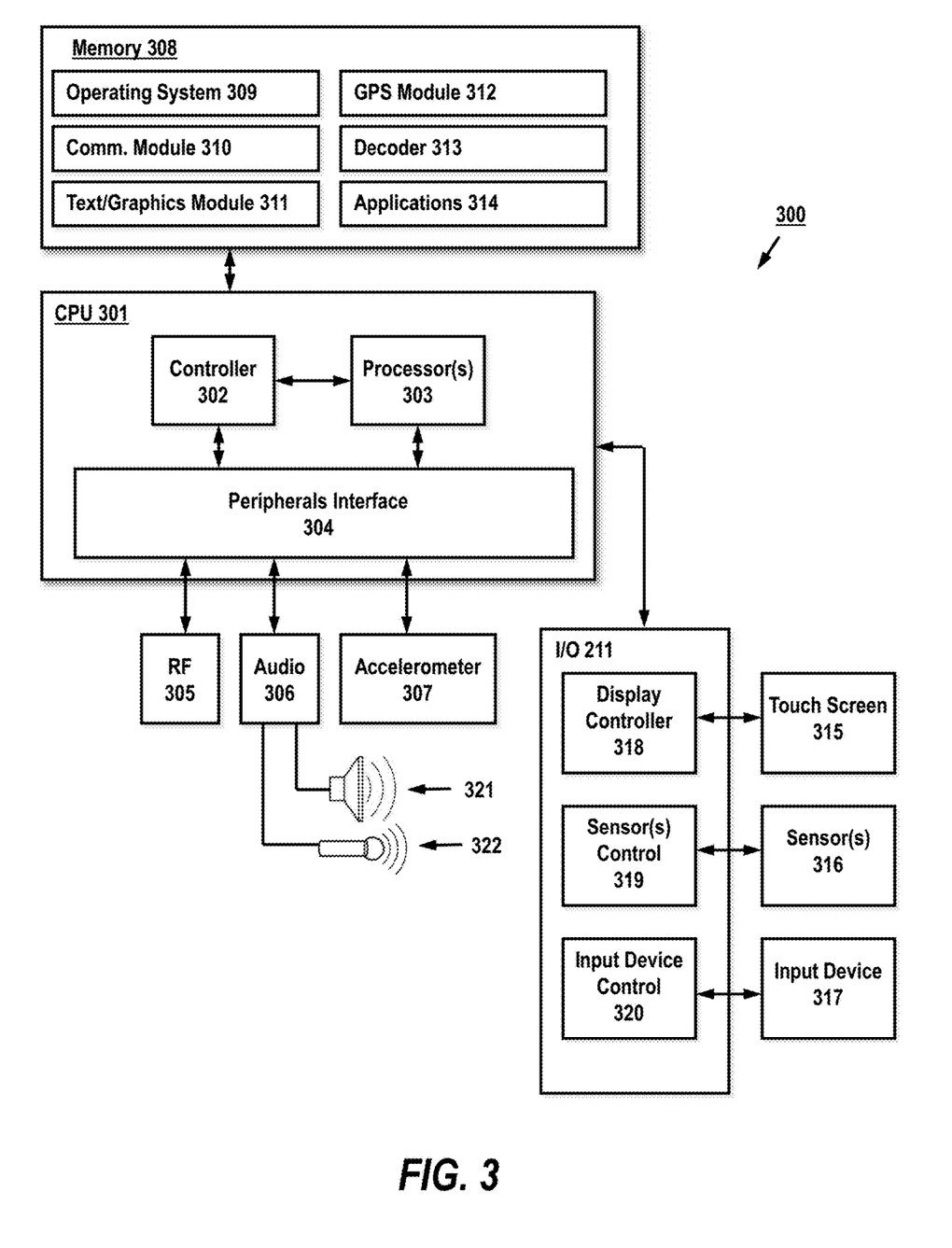
FIG. 3 schematically illustrates an operating environment for a processing device configured to process data and workspaces under an illustrative embodiment.

FIG. 3 is an exemplary embodiment of a computing device 300 (such as processing devices 102, 104, 202), and may be a personal computer, smart phone, tablet computer, laptop and the like. Device 300 may include a central processing unit (CPU) 301 (which may include one or more computer readable storage mediums), a memory controller 302, one or more processors 303, a peripherals interface 304, RF circuitry 305, audio circuitry 306, accelerometer 307, speaker 321, microphone 322, and input/output (I/O) subsystem 221 having display controller 318, control circuitry for one or more sensors 319 and input device control 320. These components may communicate over one or more communication buses or signal lines in device 300. It should be appreciated that device 300 is only one example of a portable multifunction device, and that device 300 may have more or fewer components than shown, may combine two or more components, or a may have a different configuration or arrangement of the components. The various components shown in FIG. 3 may be implemented in hardware or a combination of hardware and software, including one or more signal processing and/or application specific integrated circuits.

Memory (or storage) 308 may include high-speed random access memory (RAM) and may also include non-volatile memory, such as one or more magnetic disk storage devices, flash memory devices, or other non-volatile solid-state memory devices. Access to memory 308 by other components of the device 300, such as processor 303, and peripherals interface 304, may be controlled by the memory controller 302. Peripherals interface 304 couples the input and output peripherals of the device to the processor 303 and memory 308. The one or more processors 303 run or execute various software programs and/or sets of instructions stored in memory 308 to perform various functions for the device 300 and to process data. In some embodiments, the peripherals interface 304, processor(s) 303, decoder 313 and memory controller 302 may be implemented on a single chip, such as a chip 301. In other embodiments, they may be implemented on separate chips.

RF (radio frequency) circuitry 305 receives and sends RF signals, also known as electromagnetic signals. The RF circuitry 305 converts electrical signals to/from electromagnetic signals and communicates with communications networks and other communications devices via the electromagnetic signals. The RF circuitry 305 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 305 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 306, speaker 321, and microphone 322 provide an audio interface between a user and the device 300. Audio circuitry 306 may receive audio data from the peripherals interface 304, converts the audio data to an electrical signal, and transmits the electrical signal to speaker 321. The speaker 321 converts the electrical signal to human-audible sound waves. Audio circuitry 306 also receives electrical signals converted by the microphone 321 from sound waves, which may include utterances from a speaker. The audio circuitry 306 converts the electrical signal to audio data and transmits the audio data to the peripherals interface 304 for processing. Audio data may be retrieved from and/or transmitted to memory 308 and/or the RF circuitry 305 by peripherals interface 304. In some embodiments, audio circuitry 306 also includes a headset jack for providing an interface between the audio circuitry 306 and removable audio input/output peripherals, such as output-only headphones or a headset with both output (e.g., a headphone for one or both ears) and input (e.g., a microphone).

I/O subsystem 221 couples input/output peripherals on the device 300, such as touch screen 315, sensors 316 and other input/control devices 317, to the peripherals interface 304. The I/O subsystem 221 may include a display controller 318, sensor controllers 319, and one or more input controllers 320 for other input or control devices. The one or more input controllers 320 receive/send electrical signals from/to other input or control devices 317. The other input/control devices 317 may include physical buttons (e.g., push buttons, rocker buttons, etc.), dials, slider switches, joysticks, click wheels, and so forth. In some alternate embodiments, input controller(s) 320 may be coupled to any (or none) of the following: a keyboard, infrared port, USB port, and a pointer device such as a mouse, an up/down button for volume control of the speaker 321 and/or the microphone 322. Touch screen 315 may also be used to implement virtual or soft buttons and one or more soft keyboards.

Touch screen 315 provides an input interface and an output interface between the device and a user. Display controller 318 receives and/or sends electrical signals from/to the touch screen 315. Touch screen 315 displays visual output to the user. The visual output may include graphics, text, icons, video, and any combination thereof. In some embodiments, some or all of the visual output may correspond to user-interface objects. Touch screen 315 has a touch-sensitive surface, sensor or set of sensors that accepts input from the user based on haptic and/or tactile contact. Touch screen 315 and display controller 318 (along with any associated modules and/or sets of instructions in memory 308) detect contact (and any movement or breaking of the contact) on the touch screen 315 and converts the detected contact into interaction with user-interface objects (e.g., one or more soft keys, icons, web pages or images) that are displayed on the touch screen. In an exemplary embodiment, a point or contact between a touch screen 315 and the user corresponds to a finger of the user. Touch screen 215 may use LCD (liquid crystal display) technology, or LPD (light emitting polymer display) technology, although other display technologies may be used in other embodiments. Touch screen 315 and display controller 318 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 315.

Device 300 may also include one or more sensors 316 such as heart rate sensors, touch sensors, optical sensors that comprise charge-coupled device (CCD) or complementary metal-oxide semiconductor (CMOS) phototransistors. The optical sensor may capture still images or video, where the sensor is operated in conjunction with touch screen display 315. Device 300 may also include one or more accelerometers 307, which may be operatively coupled to peripherals interface 304. Alternately, the accelerometer 307 may be coupled to an input controller 320 in the I/O subsystem 221. The accelerometer is preferably configured to output accelerometer data in the x, y, and z axes.

In some illustrative embodiments, the software components stored in memory 308 may include an operating system 309, a communication module 310, a text/graphics module 311, a Global Positioning System (GPS) module 312, decoder 313 and applications 314. Operating system 309 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 310 facilitates communication with other devices over one or more external ports and also includes various software components for handling data received by the RF circuitry 305. An external port (e.g., Universal Serial Bus (USB), Firewire, etc.) may be provided and adapted for coupling directly to other devices or indirectly over a network (e.g., the Internet, wireless LAN, etc.).

Text/graphics module 311 includes various known software components for rendering and displaying graphics on the touch screen 315, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 312 determines the location of the device and provides this information for use in various applications. Applications 314 may include various modules, including health monitoring software, sensor software, navigation software, mapping, address books/contact list, email, instant messaging, and the like.

Figure 4:
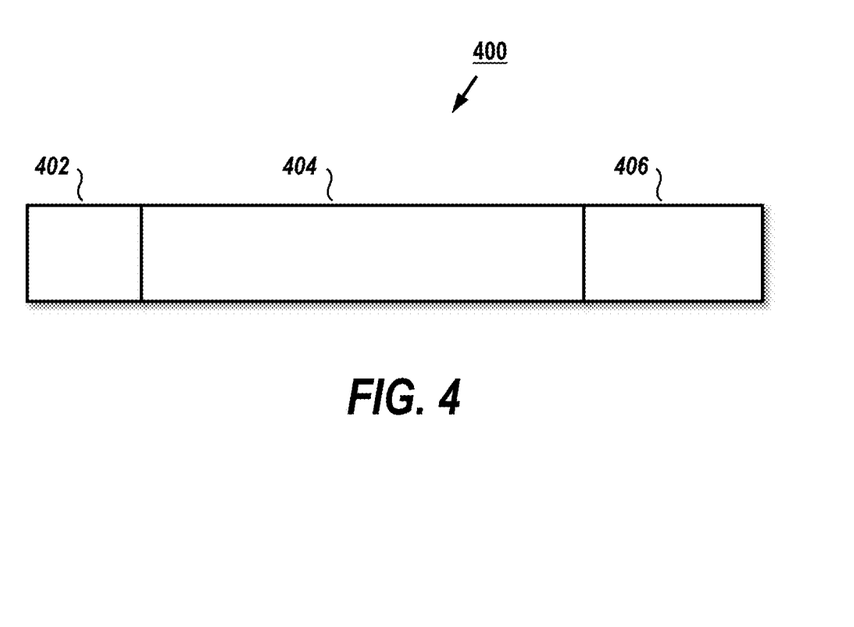
FIG. 4 shows a generic toolbar configuration for a workspace under an illustrative embodiment.

Turning to FIG. 4, a simplified toolbar 400 configuration is provided, that may be used in a workspace. In some illustrative embodiments, the toolbar 400 may be configured to have a plurality of portions 402-406, wherein each portion is associated with different functionalities. In the example of FIG. 4, toolbar 400 may have a workspace caption and view selector area 402, a toolbar docking area 404 and a workspace-specific context option and view toggle area 406. Of course, those skilled in the art will recognize that the embodiment of FIG. 4 is merely one example, and that a plurality of different configurations are contemplated in the present disclosure. The workspace caption and view area 402 may be configured to house the caption for a specific workspace in context. In examples where the workspace has view functionality, the workspace caption and view selector area may comprise an executable dropdown list styled to match the caption label. An example of this is shown in FIG.

Figure 5:
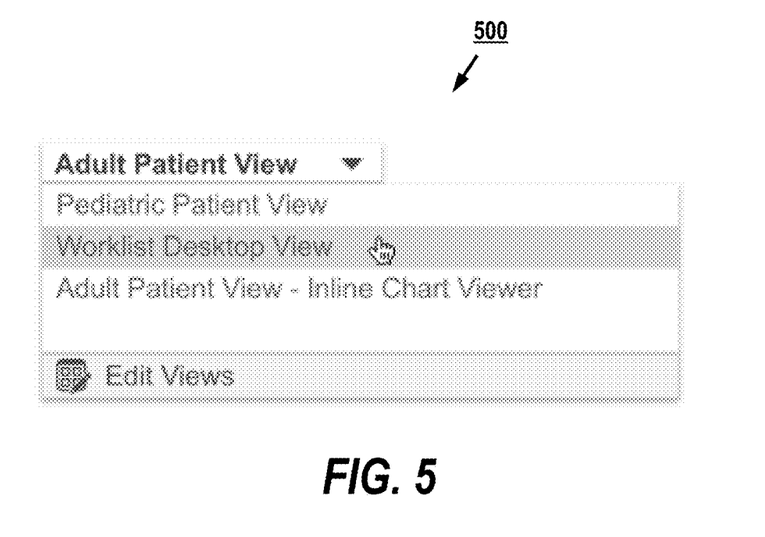
FIG. 5 shows a menu for s processing device for selecting generated workspaces under an illustrative embodiment.

5, where a dropdown list 500 is provided to allow a user to select a specific view for the toolbar and/or workspace.

Figure 6:
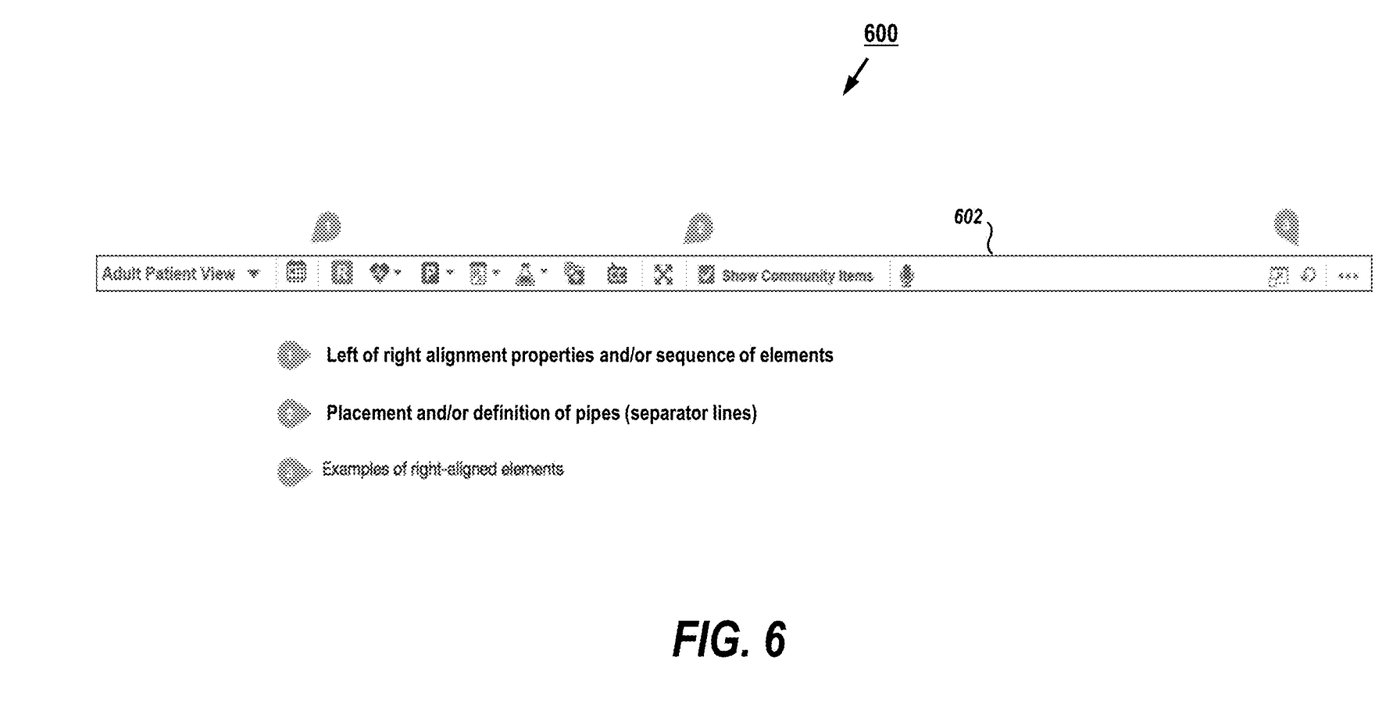
FIG. 6 shows a more detailed workspace toolbar configuration under an illustrative embodiment.

Referring back to FIG. 4, the toolbar docking area 404 may be configured to house workspace-specific custom toolbars, shown in greater detail as toolbar configuration 600 of FIG. 6, where toolbar 602 allows for the generation and positioning of a plurality of executable tool icons or elements, where the configuration allows for left and/or right alignment properties and sequence of toolbar elements, as well as placement and/or definition of pipes (separation lines) and position-aligned (e.g., right-aligned) elements. View toggle area 404 may be provided to generate executable icons for workspace-specific context options, where the available context options accessed via a menu icon may be driven by the specific workspace requirements. For example, if the workspace has tiling and/or full-page functionality, a toggle icon (see, e.g., reference "3" of toolbar 602) will be supported and may drive the layout of the workspace. In some illustrative embodiments, this area may be open to $3^{rd}$-party integrations.

Under the examples provided herein, access to custom functionality via toolbar may be provided that is specific to a workspace, where toolbars may be configured in a workspace header. Preferably, the workspace and toolbars are configured to have an appearance that meets native application-defined guidelines and may be at least initially configured using a workspace page administrator for associating toolbars with a workspace page. In one example, after an initial setup, the workspace manager module may make subsequent modifications to the workspace and/or toolbars. In this example, page administration may be utilized via a workspace type(s) and page context options may be provided via dialog type(s).

Figure 7:
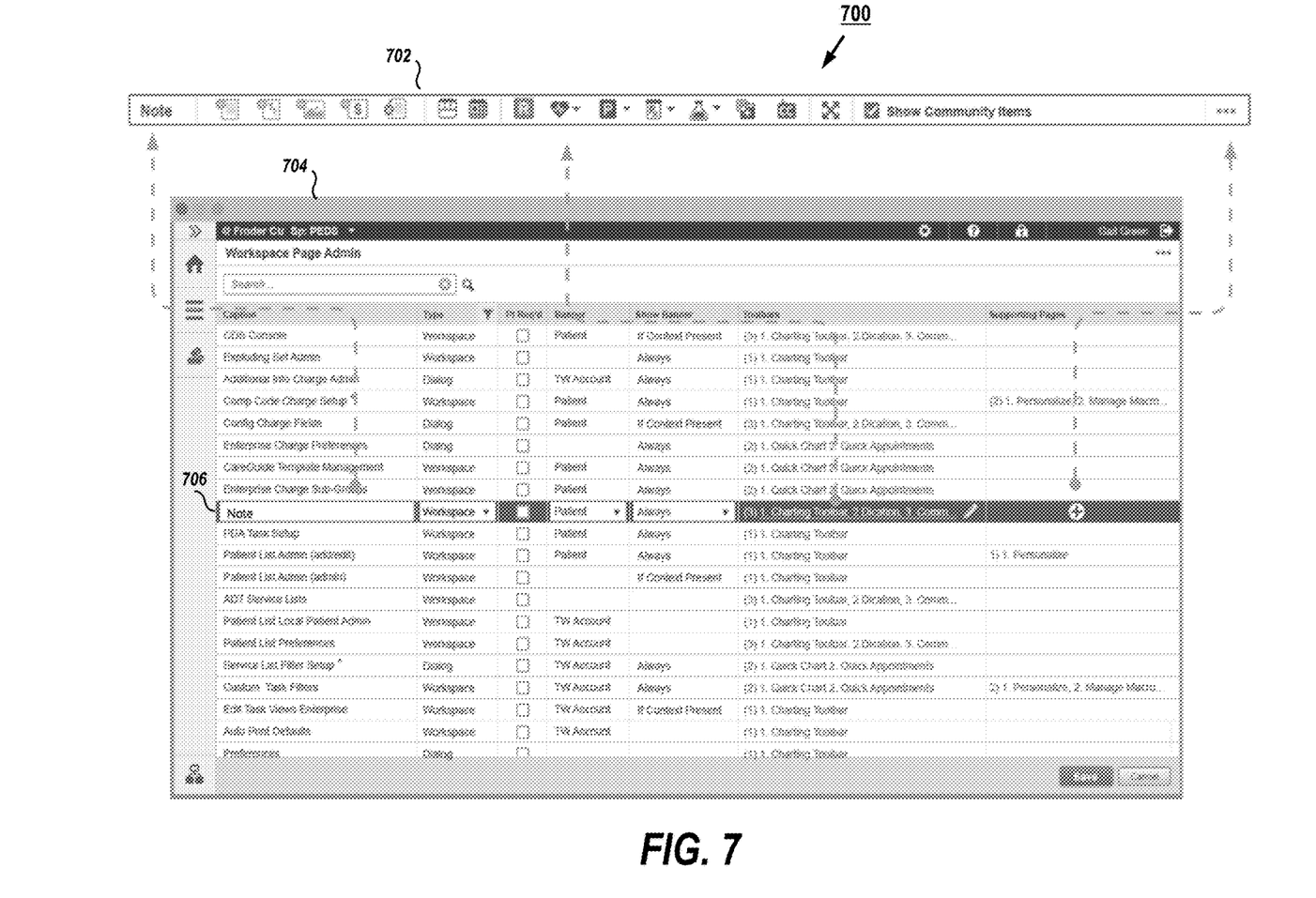
FIG. 7 shows a workspace header and toolbar definition tool for a processing device under an illustrative embodiment.

Turning now to FIG. 7 an operating environment 700 for a workspace header/toolbar definition tool is shown, with a toolbar 702 and associated workspace page administration data interface 704. In this example, the workspace administration data may be manually configured via interface 704. This manual configuration may take place during an initial release of a workspace, where predetermined data and workspace/toolbar arrangements are set. As can be seen in the figure, the workspace data 706 may include a caption identification listing that includes toolbar caption (e.g., CDS console, Exploding Set Admin, Additional Info Charge Admin, etc.) along with a type (e.g., workspace, dialog). A banner identification (e.g., patient, TW account) and banner display options (e.g., always, if context present) may be specified as well. Toolbar placement and supporting pages may also be provided as shown in the figure.

Figure 8:
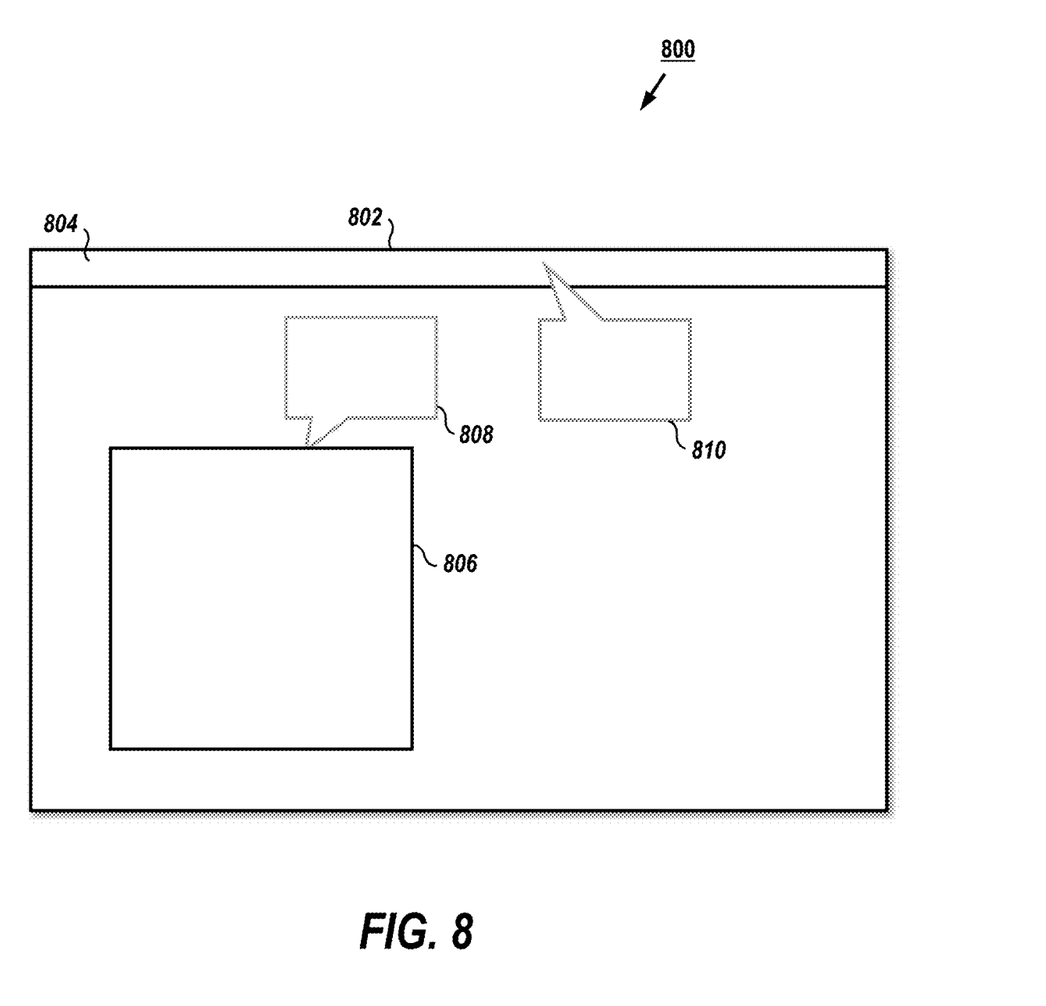
FIG. 8 shows a simplified operating environment for a processing system to provide annotation entries by users under an illustrative embodiment.

Once configured the system (e.g., 200) displays the configured workspace and associated toolbar(s) during operation of the software. A simplified example is shown in FIG. 8, where a simplified medical software operating environment 800 is shown, with computer display window 802, which represents an operational window associated with a computer program executed on a processing device (e.g., 202). Computer display window may include one or more toolbars 804 and dialog boxes 806. During operation, users may provide annotations to the one or more toolbars 804 and dialog boxes 808 by selecting an icon provided on the dialog box 806 and/or toolbar 804 (not explicitly shown for the sake of brevity). Alternately, a user may activate a key or hotkey on the processing device (e.g., 204, 320) to activate an annotation window 808, 810. Once the annotation window is activated (808, 810), a user may enter annotations into the respective annotation window. In some illustrative embodiments, the annotation entries may be text entries, and/or menu selections that are generated within each annotation window (808, 810). Once entered, the annotation module (e.g., 214) transmits the annotation data to the annotation data manager module 234 for processing as described above.

Figure 9:
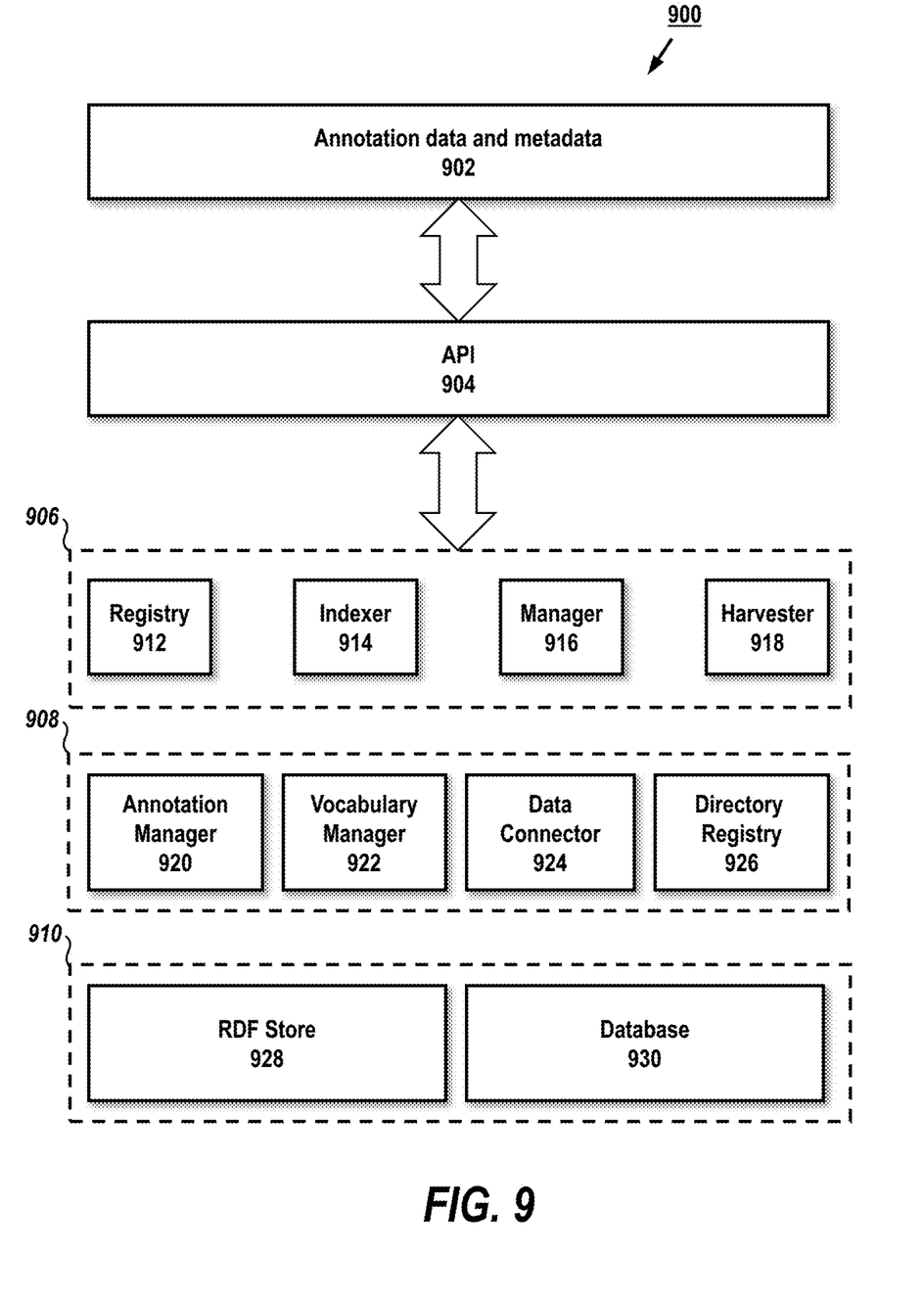
FIG. 9 shows a workspace annotation architecture for the system of FIGS. 1-2 under an illustrative embodiment.

Turning to FIG. 9, a more detailed operating environment 900 is shown for an annotation data manager module (e.g., 234) under an illustrative embodiment. In some illustrative embodiments, the annotation data manager module may include an application programming interface (API) 904 that receives annotation data and associated metadata 902 as shown in the figure. The operating environment 900 may be configured to have a core layer 906, an extension layer 908 and a storage layer 910 operatively coupled to the API 904.

Core layer 906 may include a registry module 912, an indexer module 914, a metadata manager module 916 and a harvester module 918. Registry module 912 may be configured to support systematic handling of heterogeneous metadata schemas, and may be based on a key-value data model for storing, retrieving, and managing associative arrays, and dictionary or hash table data structures. Dictionaries contain a collection of objects, or records associated with annotations, which in turn have many different fields within them, each containing data. These records are stored and retrieved using a key that uniquely identifies the record, and is used to quickly find the data within the database. Registry module 912 may be configured to register either a single metadata schema that exclusively describes administrative, descriptive, structural metadata or a community-defined METS XML that may comprise multiple metadata schemas. The registry module 912 allows managers of a medical software system to maintain multiple metadata schemas with different versions. In the case of a single metadata schema, the schema may be registered as a key-value pair, where a key may be the combination of schema namespace and version and the value is the complete schema. In the case of a METS XML, the metadata schemas used in constructing the various sections of the METS profile are extracted and individually registered. A relation map of the metadata schemas and the corresponding METS-profile may also be created. This relation map may be used to segregate incoming metadata and for reconstructing the metadata during the harvesting stage.

For enabling full-text search over metadata an indexer module 914 may be linked to the registry module 912, where the indexer module 914 executes a depth-first search, or other suitable search algorithm to recursively iterate the XSD or XML, and during each iteration, add a unique index term path the list. Metadata manager 916 may be configured to analyze the metadata associated with annotations to determine a corresponding schema and version from the key-value store. Based on the corresponding version of the available schema, metadata manager 916 may perform a schema conformance check and convert the validated metadata into a suitable format (e.g. JSON) for annotation collection data storage. Harvester module 918 may be based on Open Archives Initiative Protocol for Metadata Harvesting (OAI-PMH), or other suitable platform for harvesting (collecting) annotation-related metadata.

Extension layer 908 may be configured to integrate various third-party tools and technologies with the core layer 906 and may support reuse of existing tools, software libraries, web-services, or databases. To enable handling of annotations, a library (e.g., Anno4j) providing an implementation of the WADM specification may be integrated through the extension layer via an annotation manager module 920 that may be configured to associate annotations with the datasets as they evolve during use. Vocabulary manager module 922 may be configured as an Simple Knowledge Organization System (SKOS) where vocabularies may be imported and linked to corresponding metadata schemas during registration. Access to the vocabularies may be made via a SKOS browser using, for example, a Representational State Transfer (REST) API. Additional (e.g., external) vocabularies may be accessed using REST endpoints that are linked to their corresponding metadata schemas. Those skilled in the art will recognize that other suitable configurations are contemplated in the present disclosure. Data connector module 924 may be configured to support annotation and metadata indexing and search functions. In some illustrative embodiments, data connector module 924 may map schemas an annotation collections or create indexes with multiple types corresponding to different embedded schemas. Directory registry module 926 integrates and manages the various annotations, metadata and schemas into directories for access and searching.

Storage layer 910 may include a Resource Description Framework (RDF) store 928 (or "triplestore") to function as a graph database for storing annotations and metadata as semantic facts. The database may function to allow storage and retrieval of triples through semantic queries. Typically, a triple will be configured as a data entity composed as a subject-predicate-object (e.g., "x-ray needs icon", "Bob is hypoglycemic", "screen is small", etc.). In some illustrative embodiments, RDF store 928 may be configured to infer implicit facts out of the explicit statements of annotations and/or associated metadata. Inferencing relationships out of the original data may be accomplished using, for example, a semantic graph database (e.g. GraphDB), turns information into knowledge In some illustrative embodiments, the RDF store 928 may also facilitate many text analytics techniques such as extracting information from unstructured data and enriching content. By 'learning' the meaning as well as the context in which entities are used, machine learning algorithms can be used to classify entities and disambiguate between them. Apart from defining relationships, RDF triples also allow links between databases with structured data and documents that contain unstructured, free-flowing text. In this way, RDF triplestores connect entities from databases to documents that mention these entities.

Storage layer 910 may also include database 930 that may be configured as one or more databases. In one illustrative embodiment, database 930 may be configured as a multi-model database (e.g., ArangoDB) that supports a plurality of data models, such as key/value, documents and graphs, utilizing one database core and a unified query language. IN some illustrative embodiments, the query language may be declarative and allow combinations of different data access patterns in a single query. In one example, the database may be configured as a NoSQL database.

Using the configuration of FIG. 9, users of the system (e.g., 200) may load and execute workspaces and/or toolbars configured under a first set of operational layouts and/or parameters. During the course of usage, users may annotate aspects of the workspace, including dialog boxes, toolbars, icons and the like on their processing device (e.g., 202). At a predetermined time (e.g., expiration of time period, closing of the workspace, etc.) the annotations and associated metadata are transmitted to the server (e.g., 220) for processing. Typically, during annotation, the associated metadata may include, but is not limited to, the processing device ID, user information (e.g., department, user position/department, location, user age, etc.) medical context (e.g., patient, treatment, medical condition. etc.) and other data. When the annotations and metadata are received in the server, they are processed via operating environment 900 to extract all annotations and metadata. The extracted annotations and metadata are then processed in operating environment 900 to determine if annotations match any of a number of pre-stored vocabulary data items within one or more registries. In some examples, the extracted annotations and metadata are processed to determine similarities between them and vocabulary data items. If the extracted data matches or has a sufficient similarity (e.g., 70%) to pre-stored vocabulary items, the system maps the vocabulary items to one or more workspace modification algorithms operating on workspace manager module 230.

The workspace manager module 230 then proceeds to modify the existing workspace according to the annotations provided by the user, and saves the modified workspace with an identification particular to the annotation. The modifications may include changes in the workspace including, but not limited to, addition or deletion of toolbar icons and/or functions, placement of toolbars and/or functions, dialog box placement or content, order of data presentation, level of interaction with workspace items or icons (e.g., single click vs. double-click), presentation of data on the workspace, and so forth. In some illustrative embodiments, the modifications to the workspace may be particular to an individual user. In some illustrative embodiments, the workspace manager module 230 may normalize annotation data received from a plurality of users and provide a normalized workspace as part of the modification process. In some illustrative embodiments, the modifications may be conditioned on the metadata, where only annotations containing authorized metadata are used for modifying the workspace.

Figure 10:
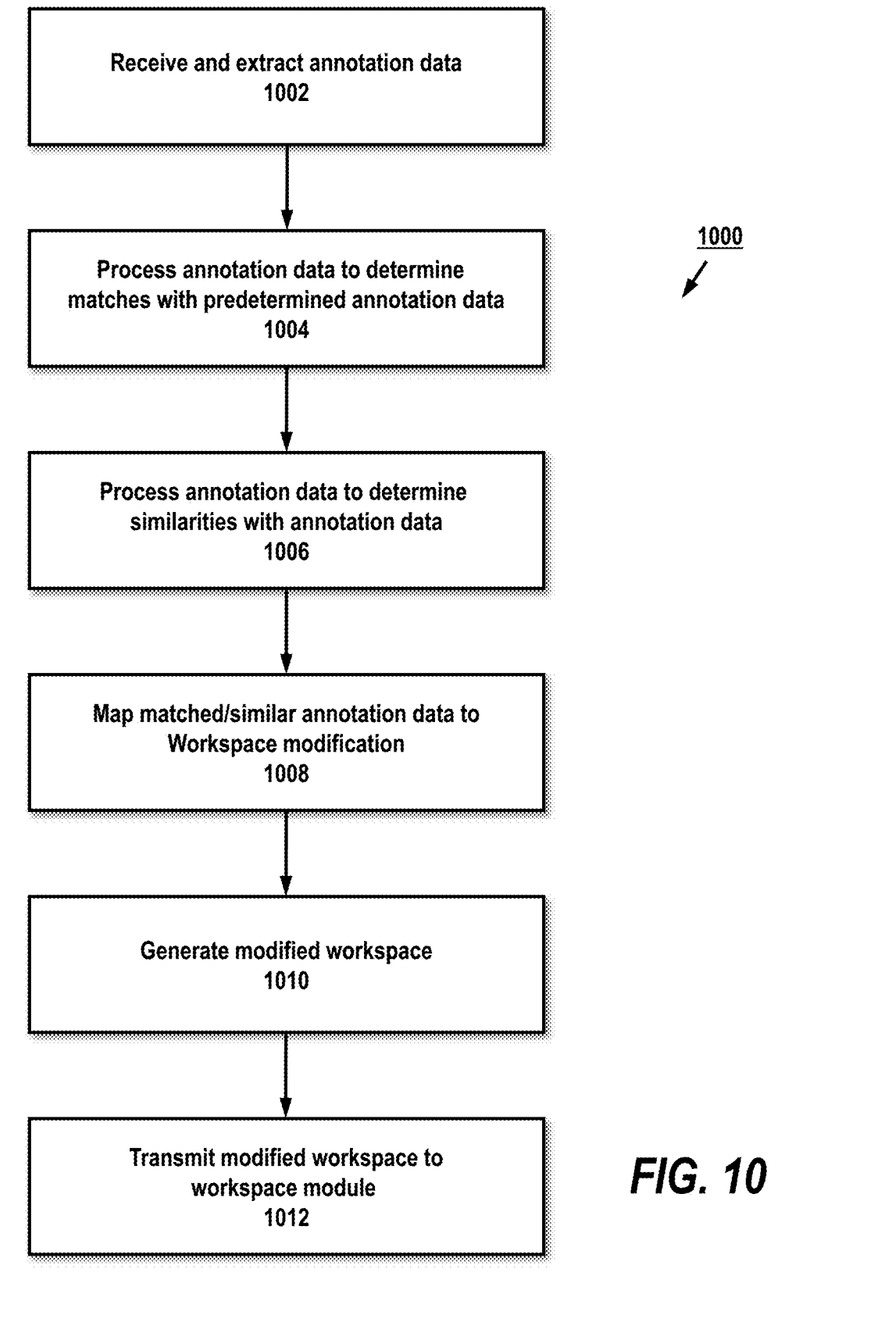
FIG. 10 shows a process for processing annotation data and associated metadata to modify a workspace environment under an illustrative embodiment.

FIG. 10 shows an illustrative process for processing annotation data and metadata for modifying workspaces under an illustrative embodiment. In block 1002, the server (e.g. 220 receives annotation data, together with the associated metadata. In block 1004, the server (e.g., 220) processes annotation data along with the metadata to determine matches with predetermined annotation data and metadata. In block 1006, the server (e.g., 220) processes annotation data and metadata to determine similarities with pre-stored annotation data and metadata. In some illustrative embodiments, block 1006 may be optional, particularly if matches are found in block 1004. In block 1008 matched and/or similar annotation data and metadata may be mapped to a database to determine workspace modifications that are associated with the mapping. In block 1010, the server (e.g., 220) generates the modified workspace according to the annotation/metadata and transmits the modified workspace to a workspace module (e.g., 216) of the processing device (e.g., 202).

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for modifying a workspace on a processing device, comprising;
    generating a workspace for a processing device via a workspace manager module;
    receiving, via communications circuitry, user annotation data and associated metadata relating to the generated workspace, wherein the user annotation data and associated metadata are configured as semantic facts of a graph database for linking structured and unstructured data;
    maintaining, via a registry module, a plurality of different metadata schemas and to relationally associate at least some of the plurality of different metadata schemas via a data connector module;
    processing, via an annotation data manager, the received user annotation data and associated metadata to determine if at least one of the user annotation data and/or metadata matches pre-stored annotation data and/or metadata contained in one or more of the plurality of different metadata schemas
    generating, via a workspace manager, a modified workspace for the processing device based on matching annotation data and/or metadata.

2. The method of claim 1, wherein the user annotation data comprises data describing a characteristic of the workspace.

3. The method of claim 1, wherein the metadata comprises at least one of data identifying a medical position of the user, a medical process being used or reviewed, location of the user, and a user team group.

4. The method of claim 1, wherein processing the received user annotation data and associated metadata the annotation data manager module comprises processing via a core layer, an extension layer, and a storage layer, operatively coupled to an application programming interface (API).

5. The method of claim 1, further comprising processing, via the annotation data manager module, the received user annotation data and associated metadata to determine if at least one of the user annotation data and/or metadata has similarity exceeding a predetermined threshold to pre-stored annotation data and/or metadata.

6. The method of claim 5, further comprising generating a modified workspace for the processing device, via the workspace manager, based on the annotation data and/or metadata having similarity exceeding the predetermined threshold.

7. The method of claim 1, further comprising determining, via the annotation data manager module, if at least one of the user annotation data and/or metadata matches pre-stored annotation data and/or metadata utilizing one of a word-matching or vocabulary/semantics algorithm.

8. An apparatus for modifying a workspace on a processing device, comprising;
   a processor;
   a workspace manager module, configured to generate a workspace for a processing device
   a memory, operatively coupled to the processor;
   communications circuitry, operatively coupled to the processor, wherein the communications circuitry is configured to receive user annotation data and associated metadata relating to the workspace, wherein the user annotation data and associated metadata are configured as semantic facts of a graph database for linking structured and unstructured data;
   a registry module, configured to maintain a plurality of different metadata schemas and to relationally associate at least some of the plurality of different metadata schemas via a data connector module; and
   an annotation data manager module, configured to process the received user annotation data and associated metadata to determine if at least one of the user annotation data and/or metadata matches pre-stored annotation data and/or metadata contained in one or more of the plurality of different metadata schemas,
   wherein the workspace manager module is configured to generate a modified workspace for the processing device based on matching annotation data and/or metadata.

9. The apparatus of claim 8, wherein the user annotation data comprises data describing a characteristic of the workspace.

10. The apparatus of claim 8, wherein the metadata comprises at least one of data identifying a medical position of the user, a medical process being used or reviewed, location of the user, and a user team group.

11. The apparatus of claim 8, wherein the annotation data manager module comprises a core layer, an extension layer, and a storage layer, operatively coupled to an application programming interface (API) for receiving the user annotation data and associated metadata.

12. The apparatus of claim 8, wherein the annotation data manager module is further configured to process the received user annotation data and associated metadata to determine if at least one of the user annotation data and/or metadata has similarity exceeding a predetermined threshold to pre-stored annotation data and/or metadata.

13. The apparatus of claim 12, wherein the workspace manager module is configured to generate a modified workspace for the processing device based on the annotation data and/or metadata having similarity exceeding the predetermined threshold.

14. The apparatus of claim 8, wherein the annotation data manager module is further configured to determine if at least one of the user annotation data and/or metadata matches pre-stored annotation data and/or metadata utilizing one of a word-matching or vocabulary/semantics algorithm.

15. One or more non-transitory computer readable media containing computer executable instructions for performing a method to modify a workspace on a processing device comprising:
   generating a workspace for a processing device via a workspace manager module;
   receiving, via communications circuitry, user annotation data and associated metadata relating to the generated workspace, wherein the user annotation data and associated metadata are configured as semantic facts of a graph database for linking structured and unstructured data;
   maintaining, via a registry module, a plurality of different metadata schemas and to relationally associate at least some of the plurality of different metadata schemas via a data connector module;
   processing, via an annotation data manager, the received user annotation data and associated metadata to determine if at least one of the user annotation data and/or metadata matches pre-stored annotation data and/or metadata contained in one or more of the plurality of different metadata schemas,
   generating, via a workspace manager, a modified workspace for the processing device based on matching annotation data and/or metadata.

16. The non-transitory computer readable media of claim 15, wherein the user annotation data comprises data describing a characteristic of the workspace.

17. The non-transitory computer readable media of claim 15, wherein the metadata comprises at least one of data identifying a medical position of the user, a medical process being used or reviewed, location of the user, and a user team group.

18. The non-transitory computer readable media of claim 15, further comprising processing, via the annotation data manager module, the received user annotation data and associated metadata to determine if at least one of the user annotation data and/or metadata has similarity exceeding a predetermined threshold to pre-stored annotation data and/or metadata.

19. The non-transitory computer readable media of claim 18, further comprising generating a modified workspace for the processing device, via the workspace manager, based on the annotation data and/or metadata having similarity exceeding the predetermined threshold.

20. The non-transitory computer readable media of claim 15, further comprising determining, via the annotation data manager module, if at least one of the user annotation data and/or metadata matches pre-stored annotation data and/or metadata utilizing one of a word-matching or vocabulary/semantics algorithm.

* * * * *